United States Patent
Nguyen et al.

(10) Patent No.: US 9,240,939 B2
(45) Date of Patent: Jan. 19, 2016

(54) DETECTING PACKET LOSS AND RETRANSMISSION IN A NETWORK ENVIRONMENT

(71) Applicant: Cisco Technology, Inc., San Jose, CA (US)

(72) Inventors: Khanh Vinh Nguyen, Milpitas, CA (US); Nir Ben-Dvora, Herzliya (IL); Harinadh Nagulapalli, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 163 days.

(21) Appl. No.: 14/060,569

(22) Filed: Oct. 22, 2013

(65) Prior Publication Data

US 2015/0109942 A1     Apr. 23, 2015

(51) Int. Cl.
*H04L 12/26*     (2006.01)

(52) U.S. Cl.
CPC ............ *H04L 43/12* (2013.01); *H04L 43/0835* (2013.01)

(58) Field of Classification Search
None
See application file for complete search history.

(56) References Cited

U.S. PATENT DOCUMENTS

| | | | |
|---|---|---|---|
| 6,473,425 B1 * | 10/2002 | Bellaton et al. | 370/392 |
| 8,363,549 B1 * | 1/2013 | Zhu et al. | 370/235 |
| 8,792,495 B1 * | 7/2014 | Dixon et al. | 370/394 |
| 2005/0018668 A1 * | 1/2005 | Cheriton | 370/389 |
| 2006/0045010 A1 * | 3/2006 | Baker et al. | 370/230 |
| 2007/0070916 A1 * | 3/2007 | Lehane et al. | 370/252 |
| 2007/0280193 A1 * | 12/2007 | Kim et al. | 370/349 |
| 2009/0086736 A1 * | 4/2009 | Foong et al. | 370/394 |
| 2009/0268742 A1 * | 10/2009 | Hama | 370/400 |
| 2010/0103946 A1 * | 4/2010 | Nomura et al. | 370/412 |
| 2011/0128853 A1 * | 6/2011 | Nishimura | 370/235 |
| 2011/0280240 A1 * | 11/2011 | Yamagaki et al. | 370/389 |
| 2011/0286469 A1 * | 11/2011 | Yasuda | 370/412 |
| 2014/0286174 A1 * | 9/2014 | Iizuka et al. | 370/241 |

OTHER PUBLICATIONS

"TCP Analyze Sequence Numbers," from The Wireshark Wiki, last edited by WenchaoWang May 10, 2011; 2 pages; [Retrieved and printed May 6, 2013] http://wiki.wireshark.org/TCP_Analyze_Sequence_Numbers.

* cited by examiner

*Primary Examiner* — Gary Mui
(74) *Attorney, Agent, or Firm* — Patent Capital Group

(57) ABSTRACT

One example method is provided for detecting end-to-end packet loss and retransmission occurring in a connection of a network environment. The method can include monitoring packets transmitted from a sender to a receiver and acknowledgement packets from the receiver to the sender using a probe located in a path between the sender and the receiver in the network environment; identifying, by the probe, a first packet as a possibly-retransmitted packet if the first packet has a fall back sequence number; classifying, by the probe, the first packet as a retransmitted packet using one or more conditions based, at least in part, on one or more of the following: characteristic(s) of the possibly-retransmitted packet, characteristic(s) of sequence numbers observed by the probe, and characteristic(s) of acknowledgements observed by the probe.

38 Claims, 8 Drawing Sheets

DETECTING PACKET LOSS AND RETRANSMISSION IN A NETWORK ENVIRONMENT

TECHNICAL FIELD

This disclosure relates in general to the field of communications and, more particularly, to detecting packet loss and retransmission in a network environment.

BACKGROUND

In a modern network environment, communications are typically enabled by packets of data being transported from one device to another device over many communication links, and in some cases, traversing many networks. These communication links connects devices and/or networks together and allows these packets to be routed properly from the one device to the other device (e.g., a sender to a receiver, a receiver to a sender, etc.). For instance, a client and a server may communicate with each other through a connection traversing a path in the network environment comprising or more communication links.

One pervasive protocol for transporting packets is the Transmission Control Protocol (TCP), which is one of the core protocols of the Internet protocol suite. TCP provides reliable, ordered, error checked delivery of a stream of octets between devices connected to, e.g., a local area network, intranet, public Internet, etc. Moreover, TCP allows a connection to be established between a sender and a receiver over communication links in the network environment. Over the connection, packets are transmitted from the sender to the receiver according to various features of TCP.

Because one or more of these communication links are not guaranteed to transmit these data packets successfully all the time, TCP provides a mechanism for retransmitting a packet (i.e., a TCP packet) from a sender if a receiver failed to receive a data packet due to a failure in one of the communication links. The mechanism requires all the packets being transmitted from a sender to a receiver to carry monotonically increasing sequence numbers to keep track of which packets have been received and acknowledged in a particular connection. Packet retransmission rates, which are evidence of packet loss and failures in the communication links, are important metrics for network monitoring and service assurance. The information associated with packet retransmission rates allows network managers to audit whether guaranteed levels of service are met, troubleshoot problems in the network, or to determine whether network improvements/maintenance is required for the communication links.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In example embodiments, methods and systems for detecting end-to-end packet loss and retransmission occurring in a connection of a network environment are disclosed. Packets transmitted from a sender to a receiver and acknowledgement packets from the receiver to the sender can be monitored using a probe located in a path between the sender and the receiver in the network environment. The probe can identify a first packet as a possibly-retransmitted packet (e.g., if the first packet has a fall back sequence number). Furthermore, the probe can classify the first packet as a retransmitted packet using one or more additional conditions. These conditions can be based on (or derived from) one or more of the following: characteristic(s) of the possibly-retransmitted packet (e.g., time, sequence number), characteristic(s) of sequence numbers observed by the probe (e.g., gap/no gap), and characteristic(s) of acknowledgements observed by the probe (e.g., repeated acknowledgements, time of last acknowledgement expecting the possibly-retransmitted packet). In certain embodiments, if none of the conditions are met, then the packet is not classified as a retransmitted packet (rather, the packet is classified as an out-of-order packet).

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, features relating to technical material that is known in the technical fields related to the embodiments have not been described in detail.

System: Communication Links and Network Elements

Figure 1:
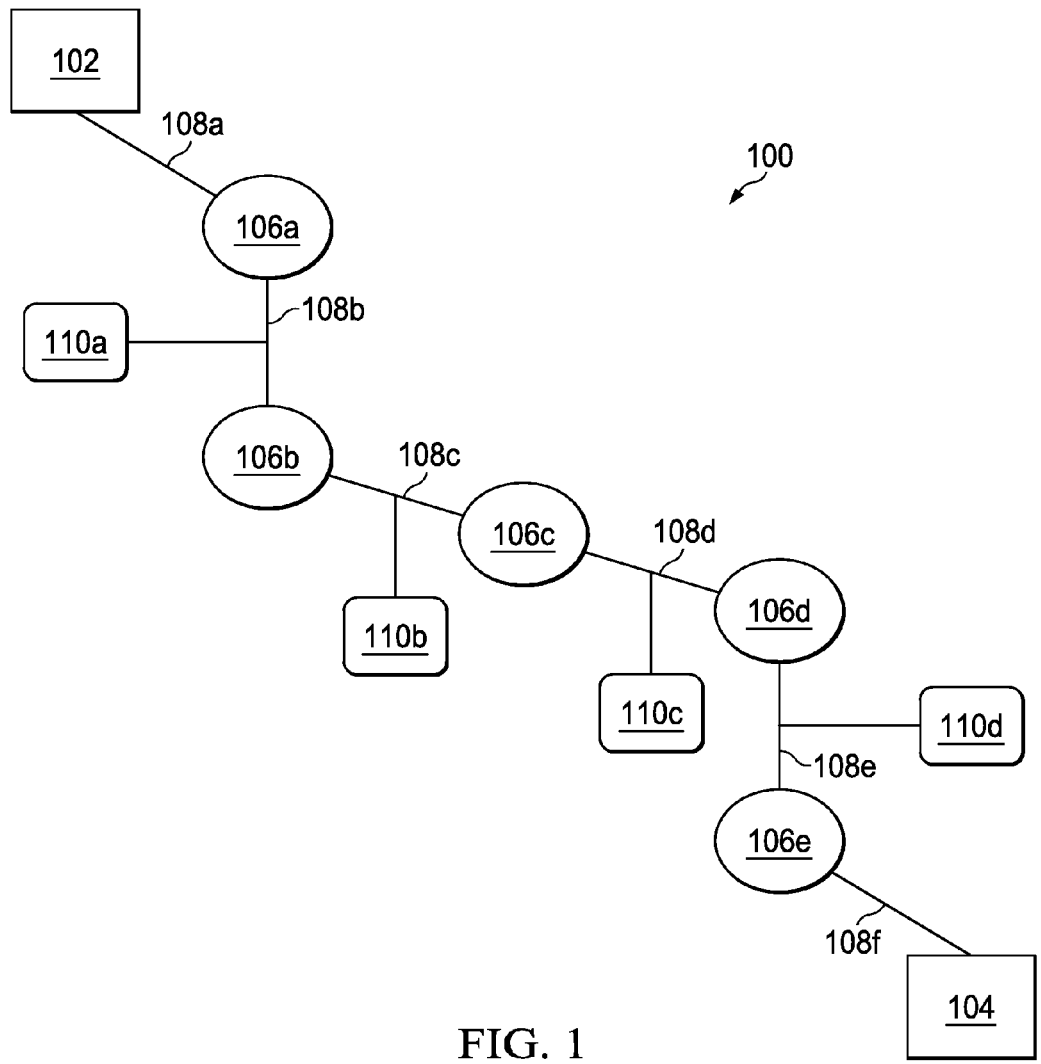
FIG. 1 shows an example system diagram illustrating a connection between a two devices over a plurality of communication links in a network environment, according to some embodiments of the disclosure.

FIG. 1 shows an example system diagram illustrating a connection between a two devices over a plurality of communication links in a network environment, according to some embodiments of the disclosure. The system 100 includes a sender 102 and a receiver 104, communicably connected to each other through network elements 106a-106e over communication links 108a-108f. The collection of communication links 108a-108f transport packets of data from the sender to the receiver. In some cases, the sender 102 is a server device, and the receiver 104 is a client device. In some cases, the sender 102 is a client device, and the receiver 104 is a server device. In a server-client scenario, a server may act functionally as the sender 102 and/or the receiver 104, and the client may act functionally as the sender 102 and/or the receiver 104, where the server and the client may communicate with each other, in one direction, or both directions.

In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets between the sender 102 and the receiver 104. Using TCP, the sender 102 and the receiver 104 can establish a TCP connection, which provides an end-to-end connection between the sender 102 and the receiver 104. Over the end-to-end connection, data can be transported in packets transmitted from the sender 102 to the receiver 104.

Figure 2:
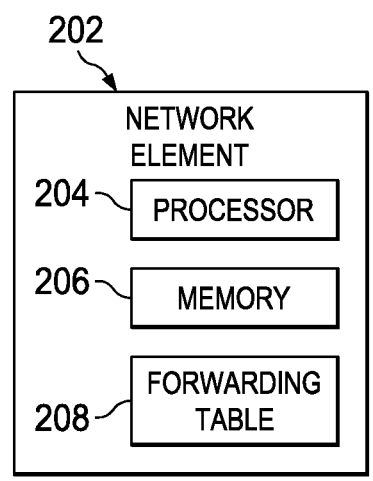
FIG. 2 shows an example system diagram illustrating a network element, according to some embodiments of the disclosure.

In some embodiments, network elements 106a-106e that facilitate packet flows between sender 102 and receiver 104 (or between endpoints of a connection) in a given network. As used herein in this Specification, the term 'network element' is meant to encompass routers, switches, gateways, bridges, load balancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information. As used herein the term router is used to refer to devices that forward packets based on network and higher layer information. The router may include, for example, a master central processing unit (e.g., CPU, processors such as Field Programmable Gate Arrays (FPGAs), Application Specific Integrated Circuits (ASICs) or one or more processors), interfaces, and a bus (e.g., a PCI bus). When acting under the control of appropriate software or firmware, the CPU is responsible for such router tasks as routing table computations, network management, and general processing of packets. It preferably accomplishes all of these functions under the control of software including an operating system and any appropriate application software. FIG. 2 shows an example system diagram illustrating a network element 202, comprising a processor(s) 204 for performing functions disclosed herein to facilitate packet flows, using memory 206 and if applicable, forwarding table(s) 208. For instance, memory 206 can store any appropriate information (e.g., routing tables, entries, network configurations, policies, forwarding trees, etc.). Forwarding table 208 may be configured to store information regarding one or more network elements to which traffic should be forwarded in communication network 100.

Normal TCP Transmission

TCP uses a sequence number to identify each byte of data. The sequence number identifies the order of the bytes sent from each end point (e.g., a sender, a receiver, a client, a server) so that the data transmitted from an end point of a TCP connection can be reliably received at the other end point irrespective of any out-of-order packets, or packet loss that may occur during transmission. For every payload byte transmitted, the sequence number is incremented typically using the length of the packet. In the first two steps of the 3-way handshake between a sender and a receiver (or a client and a server), both end points exchange an initial sequence number (ISN) for use in the TCP connection.

TCP primarily uses a cumulative acknowledgment scheme, where the receiver sends an acknowledgment signifying that the receiver has received all data preceding the acknowledged sequence number. The sender sets the sequence number field to the sequence number of the first payload byte in the segment's data field, and the receiver sends an acknowledgment specifying the sequence number of the next byte they expect to receive. For example, if a sender sends a packet containing four payload bytes with a sequence number field of 100, then the sequence numbers of the four payload bytes are 100, 101, 102, and 103. When this packet arrives at the receiving computer, it would send back an acknowledgment number of 104 since that is the sequence number of the next byte it expects to receive in the next packet.

Figure 4:
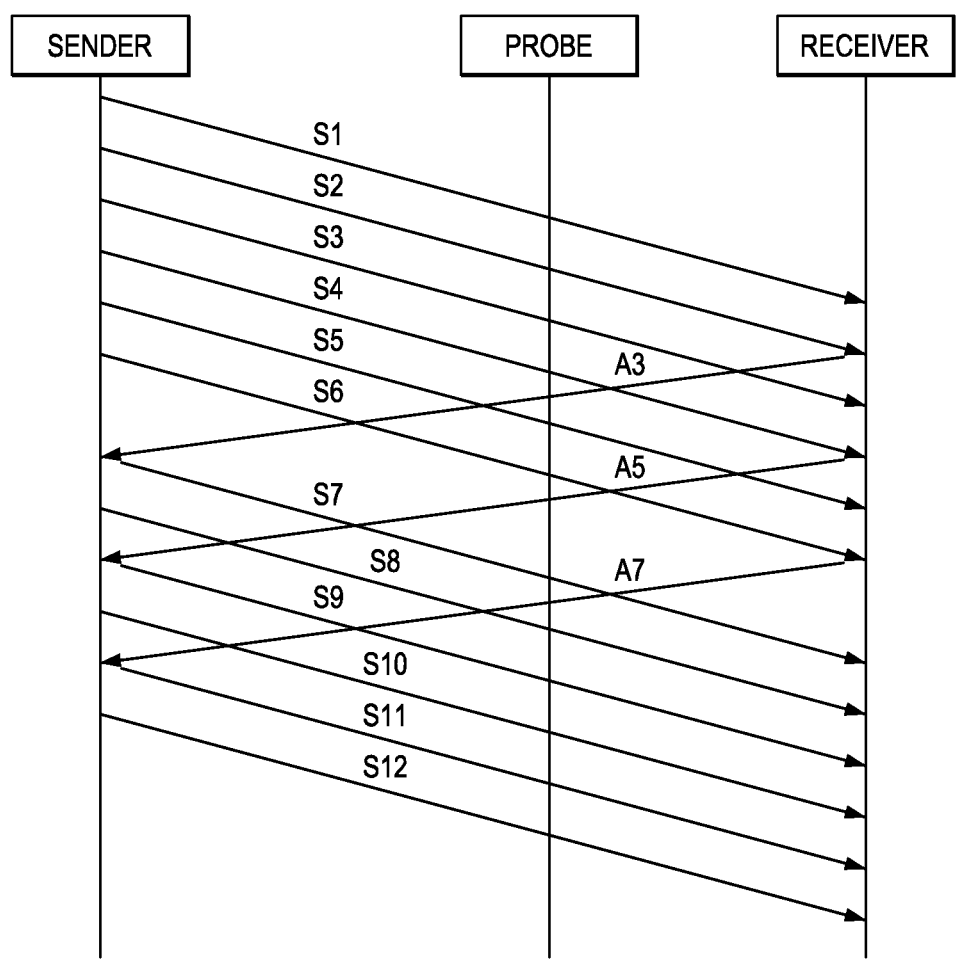
FIG. 4 shows an example timing diagram illustrating a normal TCP transmission between a sender and a receiver.

FIG. 4 shows an example timing diagram illustrating a normal TCP transmission between a sender and a receiver. After a connection between the sender and a receiver is established, the sender can begin to transmit packets of data to the receiver. In the context of TCP, a 32-bit sequence number is maintained between the sender and the receiver to keep track of packets being transmitted from the sender to the receiver. Starting from an initial sequence number (e.g., an initial sequence number of "1" for packet "S1" for illustration), the sender transmits packets of data which has monotonically increasing sequence numbers, e.g., increasing based on the length of the packet (e.g., a packet length of "1" for illustration), so each sequence number corresponds to the amount of data transmitted so far. For simplicity, the monotonically increasing sequence numbers in the packets transmitted from the sender are illustrated by "S1", "S2", "S3", . . . "S13".

To inform the sender that a packet has been transmitted successfully across the communication links, the receiver has a mechanism to acknowledge receipt of a packet by transmitting acknowledgments back to the sender. An acknowledgement serves to indicate that X amount of data has been received at the receiver so far without missing packets. More specifically, the acknowledgment may indicate that packets with monotonically increasing sequence numbers have been received without any missing packets (or gaps) in between, and expects to receive a packet having a next (expected) sequence number Y from the receiver. The receiver may increment the sequence number of the last packet received, e.g., by the packet length, to obtain the next (expected) sequence number (e.g., X+packet length) and then transmit an acknowledgement having the next sequence number to the sender.

For instance, after receipt of the packet "S2", the receiver increments the sequence number "2" with the packet length "1" (for simplicity) to obtain "3" as the next (expected) sequence number. The receiver then transmits an acknowledgement "A3" to indicate the receipt of the packet "S2", and to indicate that the receiver expects the packet "S3" with the next sequence number "3" from the sender. When the receiver receives the packet with the next sequence number "3", i.e., "A3", the receiver increments the sequence number in the packet received "3" by the packet length "1" and obtains the next (expected) sequence number "4". When the receiver receives the packet with the next sequence number "4", i.e., "A4", the receiver increments the sequence number in the packet received "4" by the packet length "1" and obtains the next (expected) sequence number "5". After receiving packet "S4", the receiver may transmit an acknowledgement having the next (expected) sequence number "5", to indicate that the receiver received the packet "A4" and expects the packet "A5". For efficiency reasons, the receiver may selectively acknowledge the receipt of packets (not every received packet is acknowledged), which is a feature provided by TCP. For example, the receiver may transmit an acknowledgement only every two packets received from the sender, three packets, four packets, and so on. Because communications are often occurring in both directions between the end points of a TCP connection, acknowledgements from the receiver may be piggy backed on a packet transmitting data from the receiver to the sender.

According to TCP, the sender may start a timeout period for each packet transmitted to wait for an acknowledgment to return from the receiver indicating that the packet has been received. If no acknowledgement for the particular packet has been received during the timeout period, the sender assumes that the packet is lost and retransmits the unacknowledged packet.

If the receiver does not receive the packet having the next (expected) sequence number, the packet is likely to be lost, and the receiver continues to transmit an acknowledgement with the next (expected) sequence number to inform the sender that the packet for the next (expected) sequence number has not been received. The receiver may transmit repeated acknowledgements until the packet with the next (expected) sequence number is received. TCP may provide a feature of fast transmission for allowing a sender to retransmit a lost packet if a number of repeated acknowledgements received at the sender exceeds a predetermined threshold.

Using these mechanisms, TCP provides a reliable way to transmit packets from a sender to the receiver, even in the presence of unreliable communication links in the network environment. Nonetheless, frequent or high rates of packet loss and retransmission may indicate a quality problem with one or more of the communication links. Accordingly, minimizing packet loss and retransmission remains an important goal for network administrators aiming to improve the quality of the communication links.

Understanding Packet Loss and Retransmission

Packet loss is generally defined as the event where a packet was not successfully transmitted across a particular communication link (e.g., because the packet was erroneously dropped, corrupted, etc.). Local packet loss is defined as the event where a packet is lost in a particular communication link. Upstream packet loss is defined as the event where a packet is lost in a communication link somewhere between the sender and the probe (not between the probe and the receiver). Downstream packet loss is defined as the event where a packet is lost in a communication link somewhere between the probe and the receiver (not between the sender and the probe). End-to-end packet loss is defined as the event where a packet is lost in any one of the communication links between the sender and the receiver. Packet retransmission is generally defined as the event where, once the sender detects that the packet is likely lost (in one of the communication links), the sender retransmits the packet to the receiver.

Deploying Probes to Monitor Retransmission

Monitoring packet loss by an active agent (e.g. interface) implemented at a network element is sometimes straight forward because it is the same entity that drops the packets, but such a solution can monitor only local packet loss rates and not end-to-end loss rates. However, in some cases, monitoring packet loss by an active agent is not so straight forward because such an active agent implemented at the software layer of the network element would not have sufficient information from the hardware layer to detect a drop that occurred in the hardware layer. On the other hand, passive agent (i.e., a probe monitoring a particular communication link) can detect packet drops that occurred at remote locations, but this is expensive and difficult. For instance, if monitoring of end-to-end packet loss is desired, a large number of active probes may have to be deployed at many communication links, across a large geography, and be equipped with sufficient hardware to monitor a large number of connections and packets that are transported in the connections.

Figure 3:
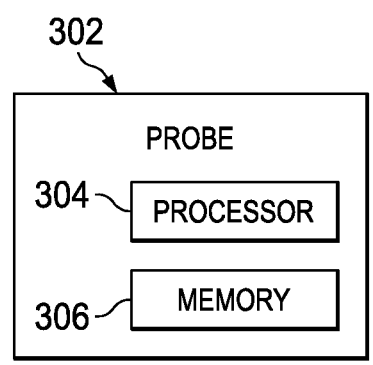
FIG. 3 shows an example system diagram illustrating a probe, according to some embodiments of the disclosure.

Referring back to FIG. 1, to detect packet retransmission, one or more probes may be deployed at the any of the communication links 108*a-f* to monitor packets being transported on the corresponding communication link. FIG. 3 shows an example system diagram illustrating a probe 302 connected to a communication link for monitoring packets being transported on the communication link, comprising processor(s) 304 for monitoring/analyzing packets (or any other functions disclosed herein) to determine packet loss and retransmission rates using memory 306 to store log of packets traveling on communication link to which the probe is connected. Probes 110*a*-110*d* are generally configured to monitor packets and analyze packet flows to determine packet loss and retransmission rates. Probes 110*a*-110*d* illustrate some possible communication links in which probes can be deployed. The probe, in some cases, may be deployed on communication links 108*a* and/or 108*f*. In some embodiments, probes may also be deployed within one or more of the network elements 106*a-e*. In this illustration, probe 110*a* is the closest to the sender 102 (farthest from receiver 104), while 110*d* is the closest to receiver 104 (farthest from sender 102).

Detecting Packet Retransmission Using Sequence Numbers List Look Up

Conventional network monitoring products typically measures TCP packet loss rate by detecting retransmitted packets, i.e., determining whether a packet has been transmitted before. If a packet has been transmitted before, i.e., it is already present in a list of previously seen/observed sequence numbers, then the probe classifies the packet as a retransmission, or a retransmitted packet. In this conventional method, a probe maintains a list of recent sequence numbers observed in each TCP connection, up to certain maximum size (usually the TCP sliding window size). For each new packet, the probe looks up the list of previously seen sequence numbers to check if the packet has a sequence number that has been already seen recently. If found, the probe determines that the packet is a retransmission of a packet due to packet loss.

Figure 5:
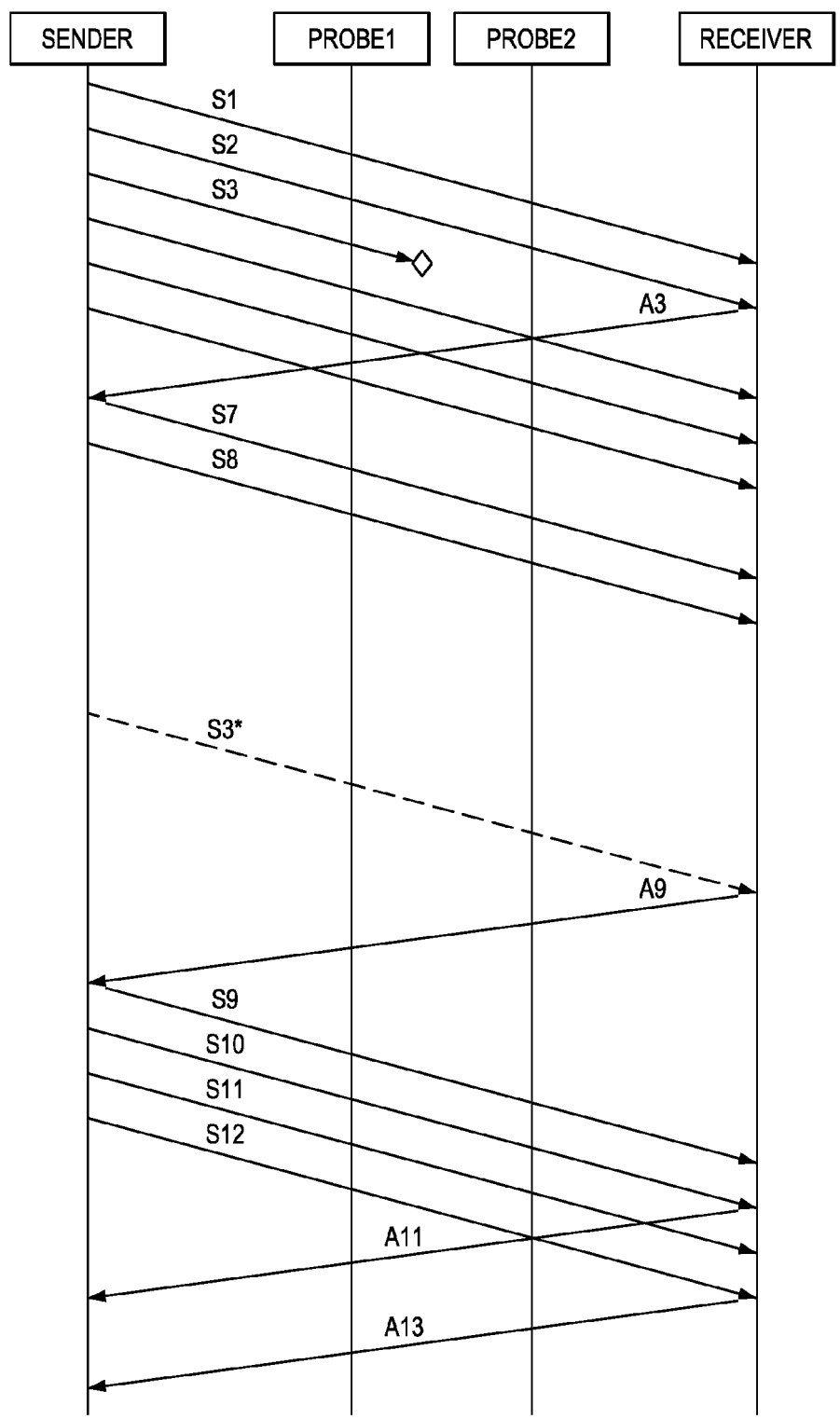
FIG. 5 shows an example timing diagram illustrating a conventional method for detecting packet retransmission.

This method is expensive in terms of CPU and memory usages, especially if there are large numbers of flows and/or high packet rates. Another limitation of this method is that it does not work well if the probe is near the receiver. In this case, the probe may not be able to detect the retransmissions because packets are dropped before they reach the probing point and thus the probe does not see the duplicated sequence numbers. FIG. 5 shows an example timing diagram illustrating a conventional method for detecting packet retransmission. For "PROBE1", the packet "S3" with the sequence number "3" would appear in the list of previously seen sequence numbers when the retransmitted packet "S3*" is observed. The retransmission of "S3" and thus the (downstream) packet loss of "S3" is detected by "PROBE1". However, for "PROBE2", the probe does not see the packet "S3" because it has been dropped prior to reaching the probe. Thus, "S3" is not in the list of previously seen sequence numbers, and retransmitted packet "S3*" would be considered the first time it has been transmitted. "PROBE2" would not classify "S3*" correctly as a retransmission, but likely incorrectly as a delayed or out-of-order packet.

The following is pseudocode which illustrates the above described conventional method used in a probe used for detecting packet loss between a server and a client (which may each transmit data as a sender or as a receiver)

```
FOR EACH packet of TCP connection
    IF packet.sender == client /* Forward direction: client->server */
        /* Check if sequence number was already seen recently */
        found = LIST_LOOK_UP (client.seqList, packet.seq)
        IF found
            /* classify as retransmit */
            client.retrans = client.retrans + 1
        ELSE
            LIST_INSERT (client.seqList, packet.seq)
            IF LIST_LENGTH (client.seqList) > MAX_LEN
                LIST_TRIM (client.seqList)
            ENDIF
        ENDIF
    ELSE /* Reverse direction: server->client */
        /* Check if packet seq number was already seen recently */
        found = LIST_LOOK_UP (server.seqList, packet.seq)
        IF found
            /* classify as retransmit */
            server.retrans = server.retrans + 1
        ELSE
            LIST_INSERT (server.seqList, packet.seq)
            IF LIST_LENGTH (server.seqList) > MAX_LEN
                LIST_TRIM (server.seqList)
            ENDIF
        ENDIF
ENDFOR
```

The most expensive part of the algorithm is the LOOK_UP/INSERT operations. If the list is sorted, then each lookup operation requires log(N) comparisons, where N is the length of the list. The memory usage of the algorithm is approximately N×X number of bytes for encoding the sequence number (e.g., 4 bytes) per direction. For example if N=128 and X=4, then the algorithm requires 1024 bytes per bi-directional connection plus other overheads to maintain the sorted list. Hash table lookup could be faster, but it requires even more memory.

Because the conventional method is expensive, it is often used as an off-line analysis tool, which requires capturing the packets to a trace file, then examining the packet sequences in the trace file to determine packet loss and retransmissions. Off-line analysis tools are used primarily for troubleshooting and are not suitable for large-scale real-time monitoring because capturing/examining packet flows would be very resource intensive, especially for high-speed networks.

Because of these difficulties, measuring end-to-end packet loss rate on-line is usually done by high-power stand-alone probes such as Cisco NAM and not network elements with limited CPU and memory resources such as switches and routers. Furthermore, the deployment of these passive probes are limited to communication links near the sender to achieve accurate measurements of packet loss and retransmission. For full end-to-end packet loss and retransmission detection, active agents, or passive probes capable of measuring local/downstream packet loss may need to be deployed in many network elements and/or communication links across the network, thereby increasing the costs significantly.

More Efficient Approach: End-to-End Packet Loss and Retransmission Detection

The following sections describe a different approach for detecting TCP packet loss and retransmission. This approach is much more efficient and does not require the probe to be near the sender. Unlike the conventional method which tracks TCP sequence numbers in each direction separately and stores them in a list of previously seen sequence numbers, the new algorithm analyzes and correlates the sequence and acknowledgement numbers in both directions as well as their timing to provide more robust measurements of end-to-end packet loss rate regardless of the probe location in the network path. Furthermore, this approach does not require LOOK_UP/INSERT operations, and implements the packet loss and retransmission detection functions using a handful of variables. Specifically, the approach checks for conditions which indicate that packet loss/retransmission has occurred or is about to occur using the handful of variables. Moreover, this approach is capable of detecting end-to-end packet loss, i.e., packet loss occurring in any of the communication links, including upstream packet loss (which is a type of packet loss conventional methods cannot detect). The approach is able to detect packet loss irrespective of the location in which the packet loss occurred.

Although the new algorithm is more sophisticated than the conventional algorithm, it has a smaller foot print and uses less computational resources. It does not need to maintain long lists of sequence numbers and requires only a few state variables per connection. As a result, this algorithm can be implemented in any suitable network element because of the smaller foot print on computational resources (instead of having to provide expensive dedicated hardware for monitoring packet flows). Furthermore, the new algorithm can be run on-line because it uses less computational resources, as opposed to conventional off-line methods.

Figure 6:
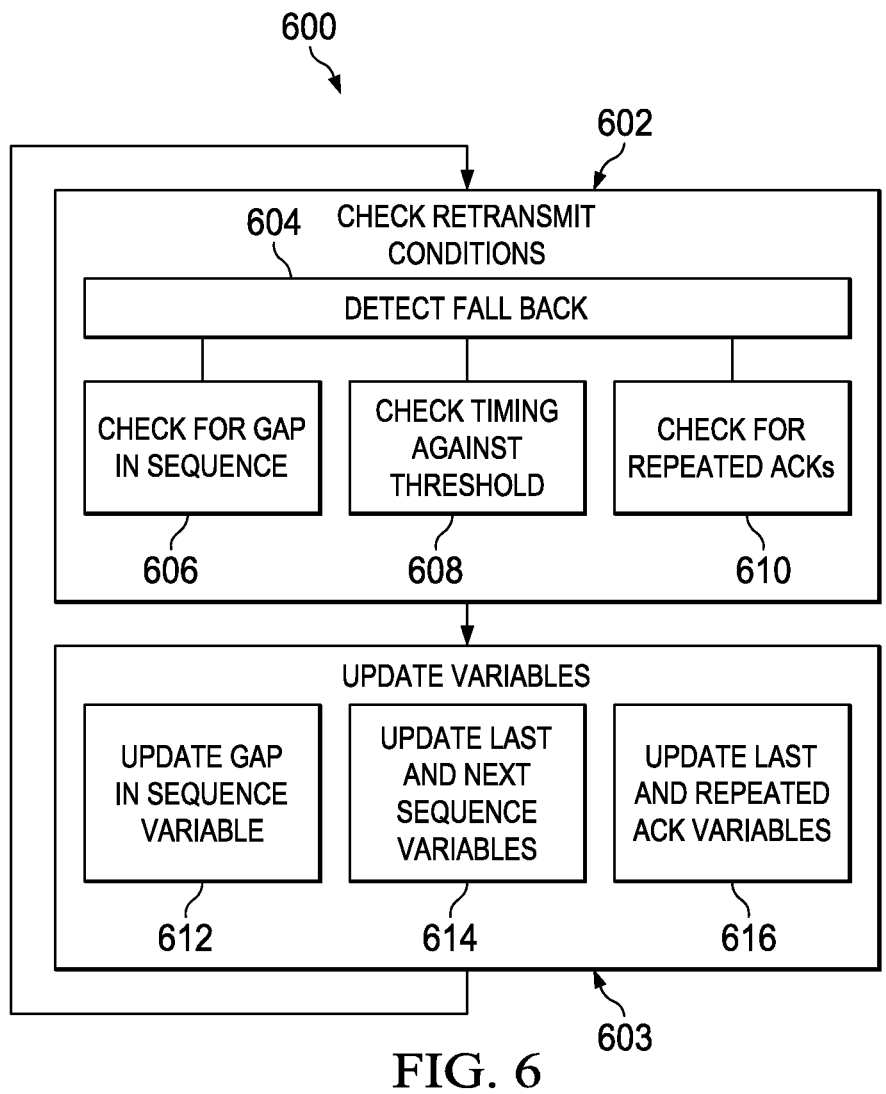
FIG. 6 is a simplified flowchart illustrating an example procedure for detecting packet loss and retransmission, according to some embodiments of the disclosure.

FIG. 6 is a simplified flowchart illustrating an example procedure for detecting packet loss and retransmission using the new algorithm, according to some embodiments of the disclosure. The innovative method 600 iterates through observed packets and acknowledgements, checks for conditions which may indicate a retransmission of a packet using the few state variables (step 602), and updates the state variables accordingly (step 603). The (state) variables allows the algorithm to detect end-to-end packet loss without having to maintain a list of previously seen sequence numbers. Thus, any LOOK_UP/INSERT operations are eschewed.

The algorithm collects, monitors, and correlates data relating to the packets being transported from both directions of the TCP connections. The algorithm classifies a packet as a retransmission if certain conditions are met. In some cases, if none of the conditions are met, then the packet is not classified as a retransmission. Each classification may be used in a count or some other metric for measuring packet loss/retransmission rates and/or other suitable network metrics. Packet loss counts and appropriate (state) variables are maintained for each direction. The following pseudocode illustrates an example algorithm, which may be used in some embodiments to detect end-to-end packet loss and retransmission between a server and a client (each may be acting as a sender and a receiver). References to various parts of FIG. 6 are included below.

```
FOR EACH packet of TCP connection
    IF packet.sender == client /* Forward direction: client->server */
        /* Detect Retransmission, Check for Conditions (STEP 602) */
        IF packet.seq < client.nextSeq AND /* Seq number falls back (BOX 604) */
            (client.lastMissingSeq == 0 OR /* No previous gap in Sequence Number (BOX 606) */
                server.repeatedAcks >= 3 OR /* Fast retransmission (BOX 610) */
                packet.time – server.lastAckTime > RTT) /* Retransmit timeout (BOX 608) */
            client.pktloss = client.pktloss + 1; /* Classify as Retransmit */
        ENDIF
        /* Update (state) variables (STEP 603) */
        /* Update last missing sequence number (BOX 612) */
        IF packet.seq > client.nextSeq
            client.lastMissingSeq = client.nextSeq
        ELSE IF packet.seq == client.lastMissingSeq
            client.lastMissingSeq = 0; /* clear flag */
        ENDIF
        /* Update next and last sequence number (BOX 614) */
        IF packet.seq > client.lastSeq
            client.lastSeq = packet.seq
            client.nextSeq = packet.seq + packet.len
        ENDIF
        /* Update last acknowledgement (BOX 616)*/
        IF packet.ack > client.lastAck
            client.lastAck = packet.ack
            client.lastAckTime = packet.time
            client.repeatedAcks = 0;
        ELSE IF packet.ack == client.lastAck
            client.repeatedAck ++;
        ENDIF
    ELSE /* Reverse Direction: server->client */
        /* Detect Retransmission, Check for Conditions (STEP 602)*/
        IF packet.seq < server.nextSeq AND /* Sequence number falls back (BOX 604) */
            (server.lastMissingSeq == 0 OR /* No previous gap in Sequence Numbers (BOX 606) */
                client.repeatedAcks >= 3 OR /* Fast retransmission (BOX 610) */
                packet.time – client.lastAckTime > RTT) /* Retransmit timeout (BOX 608)*/
            server.pktloss = server.pktloss + 1; /* Classify as Retransmit */
        ENDIF
        /* Update (state) variables (STEP 603)*/
        /* Update last missing sequence number (BOX 612) */
        IF packet.seq > server.nextSeq
            server.lastMissingSeq = server.nextSeq
        ELSE IF packet.seq == server.lastMissingSeq
            server.lastMissingSeq = 0; /* clear flag */
        ENDIF
        /* Update last and next sequence number (BOX 614) */
        IF packet.seq > client.lastSeq
            client.lastSeq = packet.seq
            client.nextSeq = packet.seq + packet.len
        ENDIF
        /* Update last acknowledgement (BOX 616) */
        IF packet.ack > server.lastAck
            server.lastAck = packet.ack
            server.lastAckTime = packet.time
            server.repeatedAcks = 0;
        ELSE IF packet.ack == server.lastAck
            server.repeatedAck ++;
        ENDIF
    ENDIF
ENDFOR
```

The above improved algorithm monitors isolated packet loss. The same ideas could be used to detect consecutive packet loss. One or more variables may be added to maintain state to keep track of consecutive packet loss. However, the basic mechanism for detecting possibly retransmitted packet by detecting a fall back in sequence numbers can remain the same. In some cases, a time between the next ACK and retransmitted packet can be lower for a consecutive packet loss but the other conditions/checks for repeated ack or no-missing-seq may still be used.

The above algorithm can also be extended to provide an estimate of the "retransmission time" (time lost to retransmit the lost packets) which is part of the application transaction time/data transfer time and is another important metric in service performance analytics and assurance. For instance, retransmission time may be estimated from the last ACK time and the time of the possibly-retransmitted packet or some derivative thereof.

The improved algorithm is capable of inline/real-time analysis without requiring capturing/storing the packet flows. It does not need to keep the recent history of sequence numbers. As a result, the new method can scale to monitor hundreds of thousands or even millions TCP connections concurrently and compute packet loss rates in real-time using much less memory and CPU resources. More specifically, the improved algorithm uses 12 state variables of 4 bytes each per TCP connections (a total of 48 bytes per TCP connection). For example, monitoring 100,000 concurrent TCP connections would consume only 4.8 MB of memory. In comparison, the conventional methods as described using lists of previously-seen sequence numbers requires 1024+ bytes per connection (20× more than the improved algorithm).

The list of the 12 variables used in the new algorithm are:
Client.lastAckTime
Client.lastSeq
Client.nextSeq
Client.lastMissingSeq
Client.repeatedAcks
Client.pktLoss
Server.lastAckTime
Server.lastSeq
Server.nextSeq
Server.lastMissingSeq
Server.repeatedAcks
Server.pktLoss Regarding CPU resource, for a majority of packets, the improved algorithm requires only about 5 comparisons and 5 assignment operations per packet. A single CPU core is thus capable of processing tens of millions of packets per second which can match the line rate of high-speed interfaces such as 10GE (or more). The improved algorithm is more efficient that the conventional algorithm which requires expensive lookup/insert operations.

The following sections discusses the various parts of the improved algorithm in further detail. Generally, the algorithm is provided as a method for detecting end-to-end packet loss and retransmission occurring in a connection of a network environment. A probe may be deployed in the network for monitoring packets transmitted from a sender to a receiver and acknowledgement packets from the receiver to the sender. The probe may be located (at any communication link or network element) in a path between the sender and the receiver in the network environment. In some embodiments, the algorithm examines a packet (referred herein as "the present packet") at each iteration in the order that the packets are observed by the probe and updates variables used for examining the sequence number of the packet.

More Efficient Approach: Detect Fall Back Sequence Number (Box 604)

The probe may first identify the present packet as a possibly-retransmitted packet based on the sequence number of the packet. In a normal TCP connection, such as the one shown in FIG. 4, the sequence numbers monotonically increases. If the probe observes a fall back sequence number, i.e., the sequence number of a packet is less than the highest sequence number observed so far, then the packet with the fall back sequence number is a possibly-retransmitted packet.

Consider the following example. A probe observes "S1", "S2", "S3", "S4", "S5", "S6", "S7", and "S8". The next (expected) sequence number is thus "9" for a packet "S9", which is computed based on the highest sequence number received so far (e.g., "8") plus the length of a packet (e.g., "1"). The probe then observes a packet "S3". Because "3" is less than the next (expected) sequence number "9", "S3" is a packet with a fall back sequence number "3". This comparison with the next (expected) sequence number indicates that the sequence number does not follow a sequence of monotonically increasing sequence numbers. Note that a further check may be performed to determine whether the "fall back" in sequence number is actually a rollover of the sequence number back to zero or some other starting sequence number (as sequence numbers increase, at some point it will rollover and return to zero or some other starting sequence number). The check may determine whether the difference between the previous observed sequence number and the sequence number has fallen back too far (i.e., is beyond a predetermined threshold).

If the sequence number is less than the next (expected) sequence number, a fall back sequence number is detected. The next expected sequence number used in this check may be stored in a variable previously updated based on a sum of the sequence number of another packet (e.g., "S8", or packet with the highest sequence number observed so far) observed before the packet with the fall back sequence number (e.g., "S3") and the length of the other packet (e.g., "1"). The other packet observed before the present packet was part of a monotonically increasing sequence of packets and is not identified as a possibly-retransmitted packet.

The variable, the next expected sequence number, allows the algorithm to detect whether a particular sequence number falls backwards and fails to follow the monotonically increasing observed sequence numbers. The variable (shown as "client.nextSeq" and "server.nextSeq" in the pseudocode provided above) may be updated at each iteration of the algorithm based on the observed sequence number for each packet to keep track of the next (expected) sequence number (BOX 614 of FIG. 6). If the present packet has a sequence number that is greater than the last observed sequence number (i.e., the packet follows the monotonically increasing sequence numbers, indicating that the present packet is not a possibly-retransmitted packet, e.g., "IF packet.seq>client.lastSeq"), the algorithm updates the last observed sequence number variable with the sequence number of the present packet (e.g., "client.lastSeq=packet.seq") and updates the next (expected) sequence number variable with the sum of the sequence number of the present packet and the length of the present packet (e.g., "client.nextSeq=packet.seq+packet.len"). The variables may then be used, at the next iteration of the algorithm, for determining, by the probe, whether a third packet observed after the first packet is a possibly-retransmitted packet.

Identifying the present packet as a possibly-retransmitted packet is not a sufficient condition for the method to classify the packet as a retransmitted packet. Rather, it is a necessary condition for identifying that the packet is a possibly-retransmitted packet based on the sequence number of the packet. If the present packet does not have a fall back sequence number, it is a sufficient condition to not classify the present packet as a retransmitted packet, and simply updates the variables and moves on to the next iteration of the algorithm to examine the next observed packet.

This detection of a fall back sequence number allows the algorithm to identify/consider the packet having the fall back sequence number as a possibly-retransmitted packet, and further conditions described below can be checked based on this possibly-retransmitted packet. Specifically, the algorithm considers other condition(s) to determine whether the possibly-retransmitted is retransmitted packet (or an out-of-order (delayed) packet).

More Efficient Approach: Check for No Gap in Sequence Numbers (Box 606)

One of the possible conditions for use with after the detection of a fall back sequence number includes a check for no gap in the observed sequence numbers. If a packet meets the fall back sequence number condition and there is a no gap in the observed sequence numbers since the last retransmission (if any), then the algorithm classifies the packet as a retransmitted packet (e.g., the packet was observed before).

A gap in the observed sequence number is defined to be a condition where observed sequence numbers has a missing sequence number, or in other words, the sequence numbers increase monotonically but exhibits a jump in the sequence between two sequence numbers. Normally sequence numbers increase monotonically and regularly according to the length of the packets, thus, a jump means the sequence of observed sequence numbers skips over a sequence number (referred to as "the missing sequence number"). In one example, a probe observes packets "S1", "S2", "S3", "S4", "S5", "S6", "S7", and "S8". For the sequence numbers in these packets, there is no gap because each sequence number has increased monotonically by the length of the packet. In another example, a probe observes packets "S1", "S2", "S4", "S5", "S6", "S7", and "S8". For the sequence numbers in these packets, there is a gap because the sequence numbers skipped over "3". Thus, the missing sequence number is "3".

Suppose the probe observes a packet "S3" with a sequence number "3", and this packet "S3" has been identified as a possibly-retransmitted packet due to its fall back sequence number. If there is no gap in the observed sequence numbers, "S3" is very likely a retransmitted packet because "S3" is likely to have been seen before if there was no missing sequence numbers in the observed sequence numbers. If there is a gap in the observed sequence numbers, then "S3" could be an out-of-order packet. Moreover, "S3" could be the packet that has not been observed yet and carries the missing sequence number.

To check for a gap in the observed sequence numbers (without having to maintain a list of observed sequence numbers), a two-state variable may be maintained by the probe. The two-state variable may store either (1) a missing sequence number in the sequence numbers of packets observed before the first packet, OR (2) a no-gap value which indicates that the sequence numbers of packets observed before the first packet do not have a missing sequence number. This two-state variable allows the algorithm to check whether the present packet is a repeated/retransmitted packet without having to perform a computationally expensive LOOK_UP operation. The algorithm determines whether the two-state variable is holding a no-gap value, indicating that the possibly-retransmitted packet is a retransmitted packet. If the two-state variable has no-gap value, the probe classifies the possibly-retransmitted packet as a retransmitted packet. The algorithm may determine whether the two-state variable is holding a missing sequence number, indicating that the possibly-retransmitted packet could be an out-of-order packet. If the two-state variable is not holding a missing sequence number, the probe may sufficiently classify the possibly-retransmitted packet as a retransmitted packet.

To maintain the two-state variable (e.g., "client.lastMissingSeq" and "server.lastMissingSeq" in the pseudocode above), the algorithm iteratively updates the gap in sequence variable (BOX 612) based on whether the sequence number of the present packet indicates a jump from the sequence number observed just before the present packet. If the sequence number of the present packet follows the monotonically increasing sequence of sequence number, the two-state variable is not updated with a new value. However, if the two-state variable holds a missing sequence number and the sequence number of the possibly-retransmitted packet is equal to the missing sequence number (e.g., "IF packet.seq==client.lastMissingSeq"), updating the two-state variable to hold the no-gap value (e.g., "client.lastMissingSeq=0"). This state handles the state where the gap is no longer present in the previously observed sequence numbers because the present packet has the missing sequence number. If the sequence number of the first packet is greater than a next expected sequence number (e.g., packet.seq>client.nextSeq), this conditional determines whether the sequence numbers observed in the packets exhibits a gap, or has jumped over a sequence number. In other words, instead of observing the next expected sequence number, the sequence number of the present packet is greater than the next expected sequence number and thus skipped over at least the next expected sequence number. The algorithm then updates the two-state variable to hold the next expected sequence number as the missing sequence number. (The next expected sequence number is stored in a variable previously updated based on a sum of the sequence number of another packet observed before the present packet and the length of the other packet, and the other packet is not identified as a possibly-retransmitted packet (BOX 614))

More Efficient Approach: Timing Condition (Box 608)

One of the possible conditions for use with the detection of a fall back sequence number includes a check on the timing of the possibly-retransmitted packet. Specifically, the timing of the possibly-retransmitted packet is correlated against the timing of the acknowledgement expecting the possibly-transmitted packet. This timing condition/check allows the algorithm to distinguish a retransmitted packet versus an out-of-order (delayed) packet.

Figure 7:
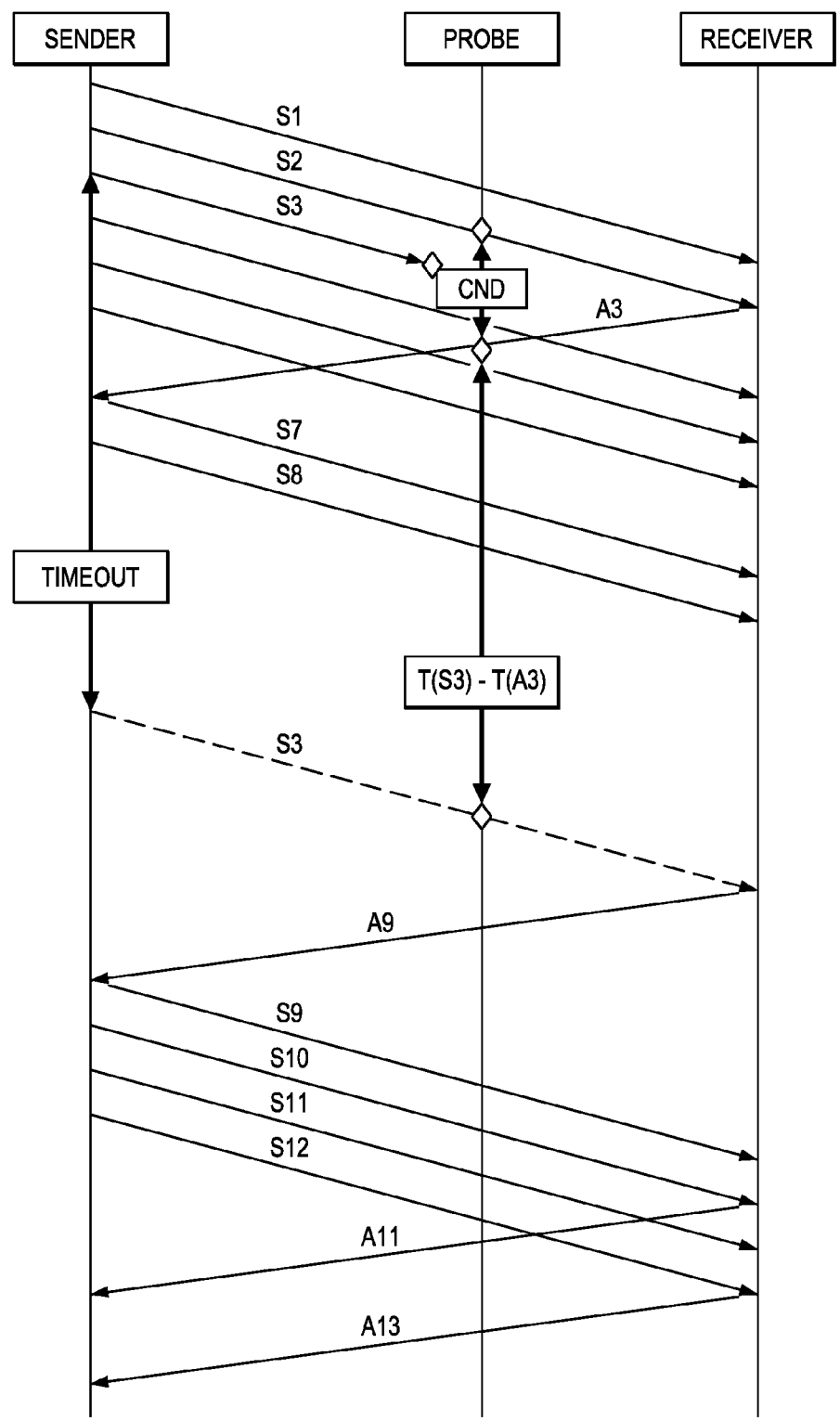
FIG. 7 shows an example timing diagram illustrating detection of packet loss and retransmission based on the timing of a possibly-retransmitted packet, according to some embodiments of the disclosure.

FIG. 7 shows an example timing diagram illustrating detection of packet loss and retransmission based on the timing of a possibly-retransmitted packet, according to some embodiments of the disclosure. According to TCP, a packet is retransmitted by the sender if no acknowledgement has been received during a timeout period. This timeout period is typically set as twice the round trip time between the sender and the receiver. As seen in FIG. 6, the packet "S3" is lost and does not reach the receiver. After a timeout period set by the transmission of "S3", the sender retransmits the packet "S3" (shown with a dotted line arrow). The probe observes the packet "S3" at T(S3).

Figure 8:
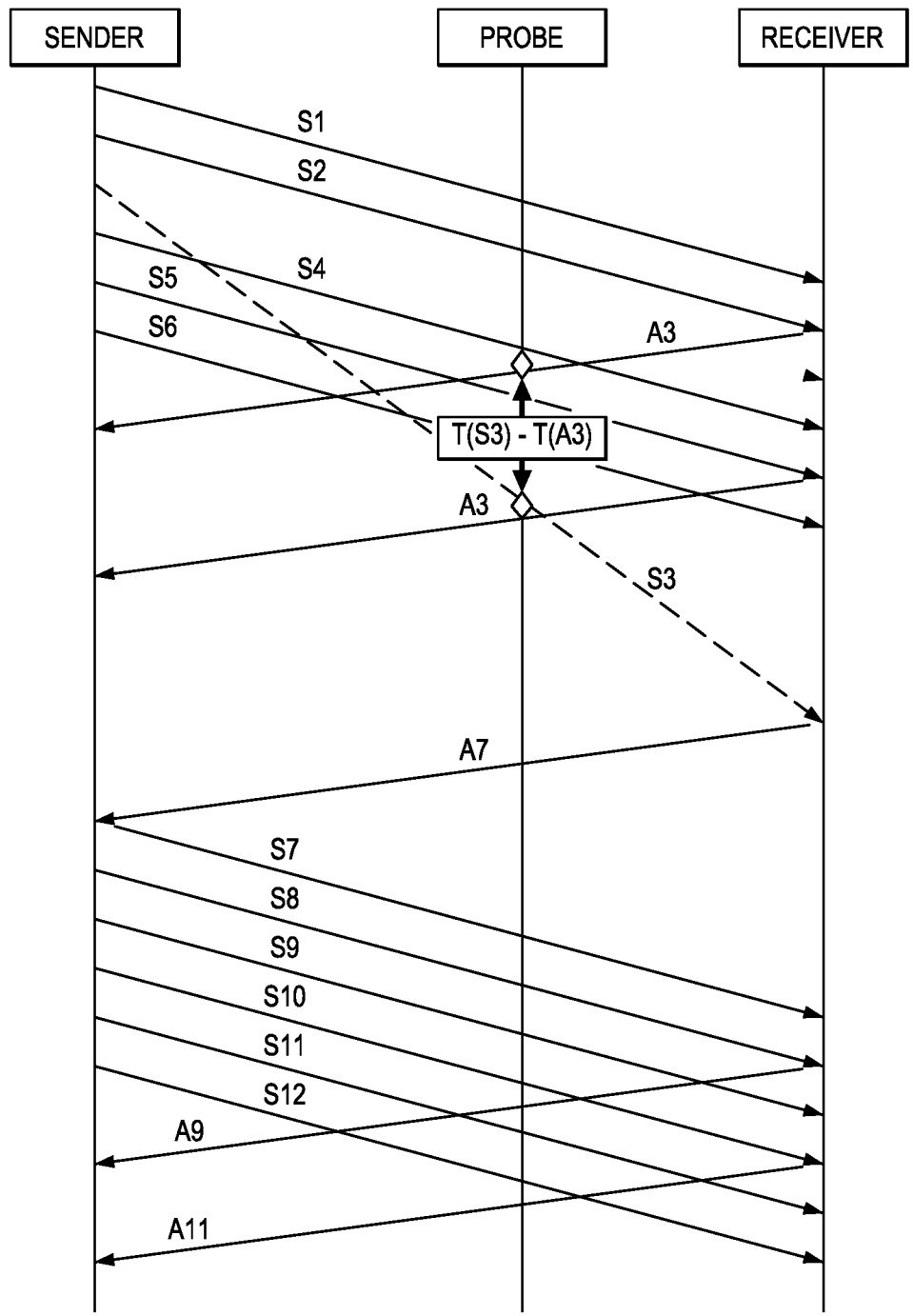
FIG. 8 shows an example timing diagram illustrating detection of an out-of-order packet based on the timing of a possibly-retransmitted packet, according to some embodiments of the disclosure.

FIG. 8 shows an example timing diagram illustrating detection of an out-of-order packet based on the timing of a possibly-retransmitted packet, according to some embodiments of the disclosure. When a packet is out-of-order or delayed, the packet "S3" (shown with a dotted line arrow) is observed at the probe at T(S3).

Empirical data suggests a packet being retransmitted due to packet loss after the expiry of the timeout period is generally observed by a probe at significantly later time than the time when an out-of-order packet is observed by the probe. In addition, a predetermined threshold value can be used to classify the possibly-retransmitted packet as either a retransmitted packet or an out-of-order packet. Specifically, the observed delay between the time of the packet with the fall back sequence number (e.g., T(S3), the possibly-retransmitted packet) and the time of the first acknowledgement of the last (or highest) acknowledgement number (e.g., T(A3)) can be compared against the predetermined threshold. (The first acknowledgement may be the earliest acknowledgement if multiple acknowledgements have been observed for this acknowledgement number.) For instance, the algorithm may check whether observed delay exceeds the network round trip time (RTT) between the sender and the receiver, or some derivation of the round trip time. This condition strongly indicates that that a packet loss and TCP timeout has likely occurred.

The use of RTT is advantageous because RTT is a midpoint of the retransmission timeout period, and may effectively allow the algorithm to distinguish between a packet loss and an out of order packet. FIG. 7 shows that in a packet loss+ retransmission event, the observed delay T(S3)−T(A3)>RTT. FIG. 8 shows that in an out-of-order event, the observed delay is T(S3)−T(A3)<RTT. Because of these characteristics of the two types of events, RTT yields nicely as the "middle-point" threshold to differentiate the two cases. The use of RTT as the threshold in the algorithm is particularly beneficial because it does not vary based on the location of the probe in the network (no matter whether the probe is close to the client or close to the server), providing an implementation which is independent from where the probe is located.

In some embodiments, the algorithm determines whether a delay, observed by the probe, between (1) the time of the possibly-retransmitted packet and (2) the time of the acknowledgement expecting the possibly-retransmitted packet exceeds a predetermined threshold (e.g., shown in the FIGS. 6 and 7 as "T(S3)−T(A3)"). If the delay exceeds the predetermined threshold, the algorithm then classifies the possibly-retransmitted packet as a retransmitted packet, and not as an out-of-order packet.

For instance, if T(S3)−T(A3) is greater than the network round trip time (e.g., shown as "packet.time−server.lastAckTime>RTT" in the pseudocode above), then the possibly-retransmitted packet is likely a retransmitted packet. If T(S3)−T(A3) is less than the network round trip time, the relatively shorter amount of delay suggests the possibly-retransmitted packet is merely an out-of-order packet, and not a retransmitted packet. If T(S3−T(A3) is less than the network round trip time, then the possibly-retransmitted packet is likely an out-of-order packet (and the probe may classify it as an out-of-order packet). While a threshold is not exact, and may lead to some false positives (i.e., classifying an out-of-order packet as a retransmitted packet incorrectly), the method provides a reasonable and efficient way to detect retransmissions.

The predetermined threshold may in some embodiments rely on the estimated network round-trip time (RTT), or some derivative or RTT. The probe may determine the RTT using the TCP three-way handshake to measure the RTT using timestamps recorded through the three-way handshake. Although some computations are required to establish RTT for the algorithm, the overall algorithm still has significant savings in computational resources over conventional methods using lists of observed sequence number to detect retransmissions.

To provide the efficient check on the timing of the possibly-retransmitted packet, the algorithm maintains a variable for storing the last acknowledgement observed and the time of the first acknowledgement of the last (or highest) acknowledgement number (BOX 616 of FIG. 6). At each iteration, the algorithm checks if a present acknowledgment (the acknowledgement being examined during an iteration of the algorithm) is greater than the previous/last acknowledgement recently observed (e.g., "IF packet.ack>client.lastAck)". If the present acknowledgement observed is greater than the last acknowledgement, then the variable for storing the last acknowledgement is updated with the present acknowledgement (e.g., "server.lastAck=packet.ack"). Furthermore, the variable for storing the time of the last acknowledgement is updated with the time of the present acknowledgement (e.g., "server.lastAckTime=packet.time").

More Efficient Approach: Check for Repeated Acknowledgements (Box 610)

One of the possible conditions for use with the detection of a fall back sequence number includes a check for repeated acknowledgements being transmitted from the receiver. According to TCP, a feature is provided to retransmit a packet even when the timeout period has not expired. This feature, called fast transmission, provides another condition that can be used for detecting whether a possibly-retransmitted packet is a retransmitted packet. If the number of repeated acknowledgements observed by the probe exceeds a predetermined threshold, then it is likely that a possibly-retransmitted packet has been retransmitted due to fast transmission.

Figure 9:
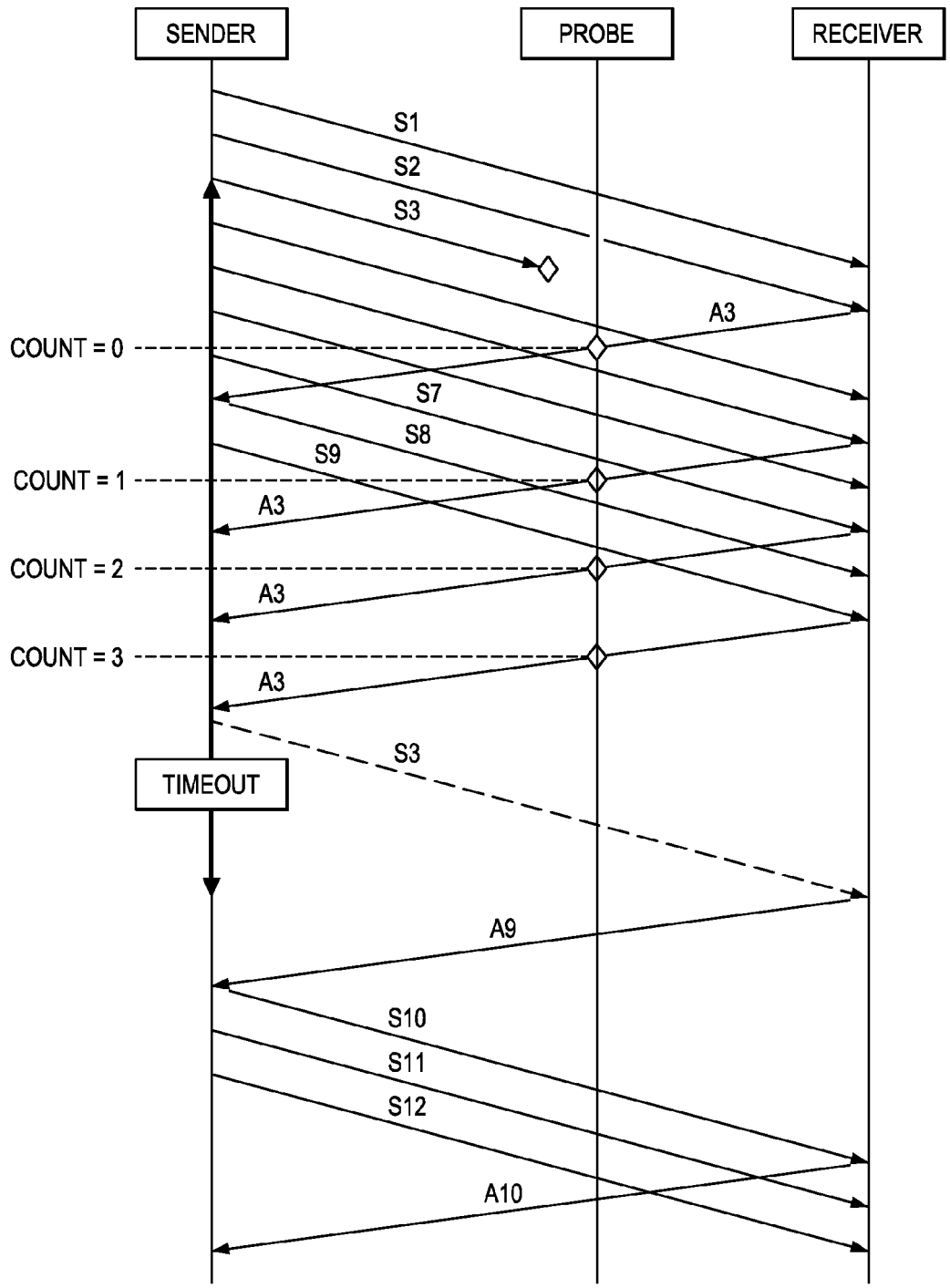
FIG. 9 shows an example timing diagram illustrating detection of packet loss and retransmission based on the repeated acknowledgements, according to some embodiments of the disclosure.

FIG. 9 shows an example timing diagram illustrating detection of packet loss and retransmission based on the repeated acknowledgements, according to some embodiments of the disclosure. The algorithm determines whether the probe has observed a number of repeated acknowledgements greater than or equal to a predetermined number of repeated acknowledgements (e.g., illustrated as "server.repeatedAcks>=3" in the pseudo code presented above). These repeated acknowledgements expecting the possibly-retransmitted packet are likely transmitted repeatedly by the receiver because the receiver has not received the packet with the sequence number of the possibly-retransmitted packet. When the number of observed repeated acknowledgements exceeds the predetermined threshold, this scenario indicates a fast transmission has occurred and the possibly-retransmitted packet has been transmitted due to fast transmission.

When the retransmitted packet "S3" (denoted by the dotted line arrow) is retransmitted, the probe has already observed four acknowledgements "A3" expecting the packet "S3" (four acknowledgements is exhibited by three repeated acknowledgements, which repeats a previously observed acknowledgement). If the probe has observed more than or equal the predetermined number of repeated acknowledgements, the algorithm accordingly classifies the possibly-retransmitted packet as a retransmitted packet. If the probe has not observed more than nor equal to the predetermined number of repeated acknowledgements, the algorithm may classify the possibly-retransmitted packet as an out-of-order packet.

The predetermined threshold of repeated acknowledgements correlates to the number of repeated acknowledgements needed to trigger fast transmission at the sender. For instance, the predetermined threshold is three, if the number of repeated acknowledgements needed to trigger fast transmission at the sender is three.

To check against the number of observed repeated acknowledgements, the algorithm maintains a variable for keeping a count of the repeated acknowledgements and a variable for storing the last acknowledgement observed (i.e., the sequence number the acknowledgement expects). If the present acknowledgement expects a sequence number that is greater than the sequence number expected by the last acknowledgement observed, the algorithm updates the last acknowledgement variable with the present acknowledgement ("e.g., server.lastAck=packet.ack"). Furthermore, the count of repeated acknowledgements is set to zero (e.g., "server.repeatedAcks=0") for this is the first acknowledgement the probe has observed expecting a particular sequence number. If the present acknowledgement expects a sequence number that is the same as the sequence number expected by the last acknowledgement observed, the algorithm increments the count of repeated acknowledgements variable (e.g., "server.repeatedAck++"). In other words, the algorithm increments the variable for storing a number of observed repeated acknowledgements if the sequence number expected by two consecutive acknowledgements transmitted from the receiver to the sender are the same, otherwise, resetting the variable to zero.

Example Embodiments, Implementation, and Applications

In one implementation, the probes 110*a*-110*d*, probes implemented on communication links 108*a* and 108*f*, and/or network elements 106*a*-106*e* (in FIG. 1) may include software to achieve (or to foster) the detection of packet loss and retransmission, as outlined herein in this Specification. Note that in one example, each of these elements can have an internal structure (e.g., a processor, a memory element, etc.) to facilitate some of the operations described herein. In other embodiments, these procedures may be executed externally to these elements, or included in some other network element to achieve this intended functionality. Alternatively, the probes 110a-110d, and/or probes implemented on communication links 108a and 108f, may include this software (or reciprocating software) that can coordinate with network elements 106a-106e to achieve the operations, as outlined herein. In still other embodiments, one or several devices may include any suitable algorithms, hardware, software, components, modules, interfaces, or objects that facilitate the operations thereof.

Note that in certain example implementations, the detecting of packet loss and retransmission functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIGS. 2 and 3] can store data used for the operations described herein. This can include the memory element being able to store variables, software, logic, code, or processor instructions that are executed to carry out the activities described in this Specification. A processor can execute any type of instructions associated with the data to achieve the operations detailed herein in this Specification. In one example, the processor [as shown in FIGS. 2 and 3] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that can include digital logic, software, code, electronic instructions, or any suitable combination thereof.

In one example implementation, the probes 110a-110d, probes implemented on communication links 108a and 108f, and/or the network elements 106a-106e can include memory element 204 for storing information to be used in achieving the detection of packet loss and retransmission procedures, as discussed herein. Additionally, any of the probes 110a-110d, probes implemented on communication links 108a and 108f, and/or the network elements 106a-106e may include instances of processor 202 that can execute software or an algorithm to perform the detection of packet loss and retransmission procedures, as disclosed in this Specification. These devices may further keep information (e.g., variables) in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

It is also important to note that the steps in the preceding flow diagrams illustrate only some of the possible signaling scenarios and patterns that may be executed by, or within, e.g., any of probes 110a-110d, probes implemented on communication links 108a and 108f, and/or the network elements 106a-106e (of FIG. 1). Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the probes 110a-110d, probes implemented on communication links 108a and 108f, and/or the network elements 106a-106e in that any suitable arrangements, chronologies, configurations, and timing mechanisms may be provided without departing from the teachings of the present disclosure. Furthermore, these operational flows can be used in any other suitable architectures and network environments, where monotonically increasing sequence numbers are used for ensuring reliable delivery of data.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, system 100 may be applicable to other protocols and arrangements. Moreover, the present disclosure is equally applicable to various technologies, aside from TCP, as these have only been offered for purposes of discussion. Note also that certain embodiments of the probes 110a-110d, probes implemented on communication links 108a and 108f, and/or the network elements 106a-106e are not necessarily intended to replace existing packet loss and retransmission detection systems. Additionally, although system 100 has been illustrated with reference to particular elements and operations that facilitate the detection process, these elements and operations may be replaced by any suitable architecture or process that achieves the intended functionality of the probes 110a-110d and/or the network elements 106a-106e.

What is claimed is:

1. A method for detecting end-to-end packet loss and retransmission occurring in a connection of a network environment, the method comprising:
    monitoring packets transmitted from a sender to a receiver and acknowledgement packets from the receiver to the sender using a probe located in a path between the sender and the receiver in the network environment;
    maintaining a two-state variable for storing either: (1) a missing sequence number in the sequence numbers of packets observed before the first packet, or (2) a no-gap value which indicates that the sequence numbers of packets observed before the first packet do not have a missing sequence number;
    identifying, by the probe, a first packet as a possibly-retransmitted packet if the first packet has a fall back sequence number; and
    if the two-state variable holds a no-gap value, classifying, by the probe, the possibly-retransmitted packet as a retransmitted packet.

2. The method of claim 1, wherein:
    identifying, by the probe, the first packet as a possibly-retransmitted packet comprises determining whether the sequence number in the first packet is less than a next expected sequence number, indicating that the sequence numbers of the packets are not monotonically increasing; and wherein the next expected sequence number is stored in a variable previously updated based on a sum of the sequence number of a second packet observed before the first packet and the length of the second packet, and the second packet is not identified as a possibly-retransmitted packet.

3. The method of claim 1, further comprising:
determining whether a delay, observed by the probe, between (1) the time of the possibly-retransmitted packet and (2) the time of the acknowledgement expecting the possibly-retransmitted packet exceeds a predetermined threshold; and
if the delay exceeds the predetermined threshold, classifying the possibly-retransmitted packet as a retransmitted packet.

4. The method of claim 3, wherein the predetermined threshold is an estimated round-trip time between the sender and the receiver in the network environment.

5. The method of claim 1, further comprising:
determining whether the probe has observed a number of repeated acknowledgements, expecting the possibly-retransmitted packet, from the receiver greater than or equal to a predetermined number of repeated acknowledgements, indicating a fast transmission has occurred; and
if the probe has observed more than the predetermined number of repeated acknowledgements, classifying the possibly-retransmitted packet as a retransmitted packet.

6. The method of claim 5, wherein the predetermined number of repeated acknowledgement is 3.

7. The method of claim 1, further comprising:
incrementing a variable for storing a number of observed repeated acknowledgements if the sequence number expected by two consecutive acknowledgements transmitted from the receiver to the sender are the same, otherwise, resetting the variable to zero.

8. The method of claim 1, further comprising:
if the two-state variable holds a missing sequence number and the sequence number of the possibly-retransmitted packet is equal to the missing sequence number, classifying the possibly-retransmitted packet is an out-of-order packet; and
updating the two-state variable to hold the no-gap value.

9. The method of claim 1, further comprising:
if the sequence number of the first packet is greater than a next expected sequence number, indicating that the sequence numbers observed in the packets exhibits a gap,
wherein the next expected sequence number is stored in a variable previously updated based on a sum of the sequence number of a second packet observed before the first packet and the length of the second packet, and the second packet is not identified as a possibly-retransmitted packet; and
updating the two-state variable to hold the next expected sequence number as the missing sequence number.

10. The method of claim 1, further comprising:
if the sequence number in the first packet is greater a last observed sequence number, indicating that the first packet is not a possibly-retransmitted packet:
updating a first variable for storing a last observed sequence number with the sequence number in the first packet; and
updating a second variable for storing a next expected sequence number based on the sum of the sequence number in the first packet and the length of the first packet; and using the first variable and/or the second variable for determining, by the probe, whether a third packet observed after the first packet is a possibly-retransmitted packet.

11. One or more non-transitory media that includes code for execution that when executed by a processor configure the processor to perform operations for detecting end-to-end packet loss and retransmission occurring in a connection of a network environment, the operations comprising:
monitoring packets transmitted from a sender to a receiver and acknowledgement packets from the receiver to the sender using a probe located in a path between the sender and the receiver in the network environment;
maintaining a two-state variable for storing either: (1) a missing sequence number in the sequence numbers of packets observed before the first packet, or (2) a no-gap value which indicates that the sequence numbers of packets observed before the first packet do not have a missing sequence number;
identifying, by the probe, a first packet as a possibly-retransmitted packet if the first packet has a fall back sequence number; and
if the two-state variable holds a no-gap value, classifying, by the probe, the possibly-retransmitted packet as a retransmitted packet.

12. The one or more non-transitory media of claim 11, wherein the operations further comprise:
determining whether a delay, observed by the probe, between (1) the time of the possibly-retransmitted packet and (2) the time of the acknowledgement expecting the possibly-retransmitted packet exceeds a predetermined threshold; and
if the delay exceeds the predetermined threshold, classifying the possibly-retransmitted packet as a retransmitted packet.

13. The one or more non-transitory media of claim 11, wherein the operations further comprise:
determining whether the probe has observed a number of repeated acknowledgements, expecting the possibly-retransmitted packet, from the receiver greater than or equal to a predetermined number of repeated acknowledgements, indicating a fast transmission has occurred; and
if the probe has observed more than the predetermined number of repeated acknowledgements, classifying the possibly-retransmitted packet as a retransmitted packet.

14. The one or more non-transitory media of claim 11, wherein the operations further comprise:
if the two-state variable holds a missing sequence number and the sequence number of the possibly-retransmitted packet is equal to the missing sequence number, classifying that the possibly-retransmitted packet is an out-of-order packet; and
updating the two-state variable to hold the no-gap value.

15. A probe for detecting end-to-end packet loss and retransmission occurring in a connection of a network environment, the probe located in a path between the sender and the receiver in the network environment, the probe comprising:
a memory for storing data comprising one or more variables;
one or more processors operable to execute instructions associated with the data, instructions comprising:
monitoring packets transmitted from a sender to a receiver and acknowledgement packets from the receiver to the sender using a probe located in a path between the sender and the receiver in the network environment;

maintaining a two-state variable in the memory for storing either: (1) a missing sequence number in the sequence numbers of packets observed before the first packet, or (2) a no-gap value which indicates that the sequence numbers of packets observed before the first packet do not have a missing sequence number;

identifying, by the probe, a first packet as a possibly-retransmitted packet if the first packet has a fall back sequence number; and if the two-state variable holds a no-gap value, classifying, by the probe, the possibly-retransmitted packet as a retransmitted packet.

16. The probe of claim 15, wherein the instructions further comprise:

determining whether a delay, observed by the probe, between (1) the time of the possibly-retransmitted packet and (2) the time of the acknowledgement expecting the possibly-retransmitted packet exceeds a predetermined threshold; and if the delay exceeds the predetermined threshold, classifying the possibly-retransmitted packet as a retransmitted packet.

17. The probe of claim 15, wherein the instructions further comprise:

determining whether the probe has observed a number of repeated acknowledgements, expecting the possibly-retransmitted packet, from the receiver greater than or equal to a predetermined number of repeated acknowledgements, indicating a fast transmission has occurred; and if the probe has observed more than the predetermined number of repeated acknowledgements, classifying the possibly-retransmitted packet as a retransmitted packet.

18. The probe of claim 15, wherein the instructions further comprise:

if the two-state variable holds a missing sequence number and the sequence number of the possibly-retransmitted packet is equal to the missing sequence number, classifying that the possibly-retransmitted packet is an out-of-order packet; and updating the two-state variable to hold the no-gap value.

19. A method for detecting end-to-end packet loss and retransmission occurring in a connection of a network environment, the method comprising:

monitoring packets transmitted from a sender to a receiver and acknowledgement packets from the receiver to the sender using a probe located in a path between the sender and the receiver in the network environment;

identifying, by the probe, a first packet as a possibly-retransmitted packet if the first packet has a fall back sequence number;

determining whether a delay, observed by the probe, between (1) the time of the possibly-retransmitted packet and (2) the time of the acknowledgement expecting the possibly-retransmitted packet exceeds a predetermined threshold; and if the delay exceeds the predetermined threshold, classifying the possibly-retransmitted packet as a retransmitted packet.

20. The method of claim 19, wherein:

identifying, by the probe, the first packet as a possibly-retransmitted packet comprises determining whether the sequence number in the first packet is less than a next expected sequence number, indicating that the sequence numbers of the packets are not monotonically increasing; and wherein the next expected sequence number is stored in a variable previously updated based on a sum of the sequence number of a second packet observed before the first packet and the length of the second packet, and the second packet is not identified as a possibly-retransmitted packet.

21. The method of claim 19, wherein the predetermined threshold is an estimated round-trip time between the sender and the receiver in the network environment.

22. The method of claim 19, further comprising:

determining whether the probe has observed a number of repeated acknowledgements, expecting the possibly-retransmitted packet, from the receiver greater than or equal to a predetermined number of repeated acknowledgements, indicating a fast transmission has occurred; and if the probe has observed more than the predetermined number of repeated acknowledgements, classifying the possibly-retransmitted packet as a retransmitted packet.

23. The method of claim 22, wherein the predetermined number of repeated acknowledgement is 3.

24. The method of claim 19, further comprising:

incrementing a variable for storing a number of observed repeated acknowledgements if the sequence number expected by two consecutive acknowledgements transmitted from the receiver to the sender are the same, otherwise, resetting the variable to zero.

25. The method of claim 19, further comprising:

determining whether there is no gap in sequence numbers observed by the probe;

if there is no gap, classifying the possibly-retransmitted packet as a retransmitted packet.

26. The method of claim 19, further comprising:

maintaining a two-state variable for storing either:

(1) a missing sequence number in the sequence numbers of packets observed before the first packet, OR (2) a no-gap value which indicates that the sequence numbers of packets observed before the first packet do not have a missing sequence number.

27. The method of claim 26, further comprising:

determining whether the two-state variable is holding a no-gap value, indicating that the possibly-retransmitted packet is a retransmitted packet; and if the two-state variable has a no-gap value, classifying the possibly-retransmitted packet as a retransmitted packet.

28. The method of claim 26, further comprising:

determining whether the two-state variable is holding a missing sequence number;

if the two-state variable holds a missing sequence number and the sequence number of the possibly-retransmitted packet is equal to the missing sequence number, classifying the possibly-retransmitted packet is an out-of-order packet; and updating the two-state variable to hold the no-gap value.

29. The method of claim 26, further comprising:

if the sequence number of the first packet is greater than a next expected sequence number, indicating that the sequence numbers observed in the packets exhibits a gap, wherein the next expected sequence number is stored in a variable previously updated based on a sum of the sequence number of a second packet observed before the first packet and the length of the second packet, and the second packet is not identified as a possibly-retransmitted packet; and updating the two-state variable to hold the next expected sequence number as the missing sequence number.

30. The method of claim 19, further comprising:
if the sequence number in the first packet is greater a last observed sequence number, indicating that the first packet is not a possibly-retransmitted packet:
updating a first variable for storing a last observed sequence number with the sequence number in the first packet; and
updating a second variable for storing a next expected sequence number based on the sum of the sequence number in the first packet and the length of the first packet;
and
using the first variable and/or the second variable for determining, by the probe, whether a third packet observed after the first packet is a possibly-retransmitted packet.

31. One or more non-transitory media that includes code for execution that when executed by one or more processors configure the one or more processors to perform operations for detecting end-to-end packet loss and retransmission occurring in a connection of a network environment, the operations comprising:
monitoring packets transmitted from a sender to a receiver and acknowledgement packets from the receiver to the sender using a probe located in a path between the sender and the receiver in the network environment;
identifying, by the probe, a first packet as a possibly-retransmitted packet if the first packet has a fall back sequence number;
determining whether a delay, observed by the probe, between (1) the time of the possibly-retransmitted packet and (2) the time of the acknowledgement expecting the possibly-retransmitted packet exceeds a predetermined threshold; and
if the delay exceeds the predetermined threshold, classifying the possibly-retransmitted packet as a retransmitted packet.

32. The one or more non-transitory media of claim 31, wherein the predetermined threshold is an estimated round-trip time between the sender and the receiver in the network environment.

33. The one or more non-transitory media of claim 31, wherein the operations further comprises:
maintaining a two-state variable for storing either:
(1) a missing sequence number in the sequence numbers of packets observed before the first packet, OR
(2) a no-gap value which indicates that the sequence numbers of packets observed before the first packet do not have a missing sequence number.

34. The one or more non-transitory media of claim 33, wherein the operations further comprises:
determining whether the two-state variable is holding a no-gap value, indicating that the possibly-retransmitted packet is a retransmitted packet; and
if the two-state variable has a no-gap value, classifying the possibly-retransmitted packet as a retransmitted packet.

35. The one or more non-transitory media of claim 33, wherein the operations further comprises:
determining whether the two-state variable is holding a missing sequence number;
if the two-state variable holds a missing sequence number and the sequence number of the possibly-retransmitted packet is equal to the missing sequence number, classifying the possibly-retransmitted packet is an out-of-order packet; and
updating the two-state variable to hold the no-gap value.

36. A probe for detecting end-to-end packet loss and retransmission occurring in a connection of a network environment, the probe located in a path between the sender and the receiver in the network environment, the probe comprising:
a memory for storing data comprising one or more variables;
one or more processors operable to execute instructions associated with the data, instructions comprising:
monitoring packets transmitted from a sender to a receiver and acknowledgement packets from the receiver to the sender using a probe located in a path between the sender and the receiver in the network environment;
identifying, by the probe, a first packet as a possibly-retransmitted packet if the first packet has a fall back sequence number;
determining whether a delay, observed by the probe and determined based on the one or more variables in the memory, between (1) the time of the possibly-retransmitted packet and (2) the time of the acknowledgement expecting the possibly-retransmitted packet exceeds a predetermined threshold; and
if the delay exceeds the predetermined threshold, classifying the possibly-retransmitted packet as a retransmitted packet.

37. The probe of claim 36, wherein the instructions further comprise:
determining whether the probe has observed a number of repeated acknowledgements, expecting the possibly-retransmitted packet, from the receiver greater than or equal to a predetermined number of repeated acknowledgements, indicating a fast transmission has occurred; and
if the probe has observed more than the predetermined number of repeated acknowledgements, classifying the possibly-retransmitted packet as a retransmitted packet.

38. The probe of claim 36, wherein the instructions further comprise:
determining whether there is no gap in sequence numbers observed by the probe based on a two-state variable stored in the memory, wherein the two-state variable stores either (1) a missing sequence number in the sequence numbers of packets observed before the first packet, or (2) a no-gap value which indicates that the sequence numbers of packets observed before the first packet do not have a missing sequence number;
if the two-state variable indicates there is no gap, classifying the possibly-retransmitted packet as a retransmitted packet.

* * * * *